United States Patent [19]

Kendall

[11] 4,244,022
[45] Jan. 6, 1981

[54] IRRIGATION CONTROL SYSTEM
[75] Inventor: Thomas L. Kendall, Big Bear City, Calif.
[73] Assignee: The Toro Company, Minn.
[21] Appl. No.: 9,304
[22] Filed: Feb. 5, 1979
[51] Int. Cl.³ .............................................. G01V 1/00
[52] U.S. Cl. ................... 364/420; 137/624.2; 239/70; 364/104; 364/120; 364/510
[58] Field of Search ............... 364/420, 107, 104, 120, 364/509, 510, 479, 101, 102, 103, 200 MS File, 900 MS File; 367/141, 141.4, 141.8, 41; 239/69, 70; 137/624.11, 624.12, 624.13, 624.16, 624.18, 624.19, 624.2; 340/147 R, 309.1, 309.3, 309.4, 310 R, 150, 151

[56] References Cited
U.S. PATENT DOCUMENTS

| | | | |
|---|---|---|---|
| 3,599,867 | 8/1971 | Griswold et al. | 239/70 X |
| 3,723,753 | 3/1973 | Davis | 307/41 |
| 3,819,921 | 6/1974 | Kilby | 364/709 |
| 3,869,854 | 3/1975 | Church | 137/624.2 |
| 3,903,515 | 9/1975 | Haydon et al. | 340/309.4 |
| 3,975,622 | 8/1976 | Horn et al. | 364/120 X |
| 4,006,464 | 2/1977 | Landell | 364/120 X |
| 4,007,458 | 2/1977 | Hollabaugh | 340/310 R |
| 4,015,366 | 4/1977 | Hall | 364/420 X |
| 4,061,927 | 12/1977 | Link | 307/41 |
| 4,101,786 | 7/1978 | Ruggles et al. | 137/624.2 |

FOREIGN PATENT DOCUMENTS

973273  8/1975  Canada ..................................... 364/104

*Primary Examiner*—Joseph F. Ruggiero
*Attorney, Agent, or Firm*—Poms, Smith, Lande & Rose

[57] ABSTRACT

A solid state control system for large-scale irrigation is disclosed. The system incorporates a central processing unit having a master clock and a central/syringe timing module system connected to a plurality of satellite controllers which are, in turn, connected to control irrigation solenoid valves. The satellites are operable on an individual basis from internal clocks and data or externally in response to multiplexed signals from the central processing unit generated by the comparison of the master clock to unique individually identified groups of data.

4 Claims, 8 Drawing Figures

IRRIGATION CONTROL SYSTEM

BACKGROUND OF THE INVENTION

The present invention relates to irrigation controllers and, more particularly, to solid-state electronic controllers used for the sophisticated control of irrigation systems.

Controlled irrigation of large turf areas is a complicated matter. While it is possible to accomplish the function manually, this mode of operation is highly consumptive of time both as to duration and in man hours. Through the years, as technology increased, the function has been transferred to automated control systems. The area to be irrigated is provided with a network of underground piping with strategically placed sprinkler heads connected thereto. Various branches of the system are controlled by interposing solenoid operated values between the branch and the source of pressurized irrigation water.

In the copending United States Patent Application No. 866,049, U.S. Pat. No. 4,165,532, entitled "Automatic Irrigation Sprinkler System Controller" by T. L. Kendall et al, assigned to the common assignee of this application, a solid-state irrigation controller is disclosed employing a number of features heretofore unavailable in such controllers. The controller disclosed therein is well-adapted for its particular scope of use and the specific teachings of the application are incorporated herein by reference.

The controller of said application is limited to a mid-range usage. That is, the features and, therefore, the attendant cost are such as to make it more sophisticated and costly than the normal homeowner might be readily willing to pay for. On the opposite end, the output capability is not sufficient for very large-scale turf applications such as found in the control of irrigation systems for golf courses and the like.

Golf courses, in particular, provide a unique environment for irrigation control. A syringe mode must be provided to allow the groundskeeper to quickly prepare the course for daily play by, for example, eliminating the morning dew from the grass, which otherwise interferes with optimum playing conditions. The amount of ground being irrigated and, therefore, the number of branch lines is such that it is highly desirable to provide a centralized and easily accomplished means for cancelling an entire watering cycle in the event of rain and/or selectively providing irrigation in areas requiring additional water without overwatering other areas. What is required is a large-scale system which can be readily modified by a groundskeeper to conform the irrigation being accomplished to the ever-changing requirements of the landscape.

Wherefore, it is the object of the present invention to provide such a large-scale irrigation control system having a high degree of flexibility while at the same time being simple to learn and easy to use.

SUMMARY

The foregoing objectives have been accomplished by the irrigation control system of the present invention comprising master controller means for maintaining a master real-time clock, continuously comparing the value of the master real-time clock to uniquely identified groups of pre-stored start-time values, and outputting a control signal including an identifier of the unique group wherein the matching one of the values was found when a match is found; and, a plurality of satellite controller means each connected to selectively receive the output from the master controller means and each adapted for maintaining a satellite real-time clock, continuously comparing the value of the satellite real-time clock to a group of prestored start-time values, selectively recognizing output signals from the master controller means having an identifier associated with a particular one of the groups of prestored values, and selectively outputting a control signal for operating an irrigation solenoid valve in response to a match between the satellite real-time clock value and the satellite group of prestored values or receipt of an output signal from the master controller means associated with the particular group of values, the satellite controller means each including means for causing the satellite controller means to output the signal in response to matches of the satellite real-time clock values, the unique group identified signals, or neither, and each further including an output whereat the output signal appears adapted for operable connection to an irrigation solenoid valve.

To further accomplish the foregoing objective, each satellite controller means includes means for changeably designating the one of the unique group identifiers recognized by the satellite controller means; the master controller means includes keyboard means for changeably storing the prestored values compared to the master real-time clock and further includes means for changeably designating the one of the groups values input through the keyboard means are added to; and, each of the prestored satellite start-times has a run-time associated therewith, each satellite controller means maintains an output signal caused by a match of one of the satellite prestored values for the associated run time thereof, and each satellite controller means further includes means for calculating and displaying the sum of all the run times presently associated with the group of satellite run-times of the particular satellite.

DESCRIPTION OF THE PREFERRED EMBODIMENT

Figure 1:
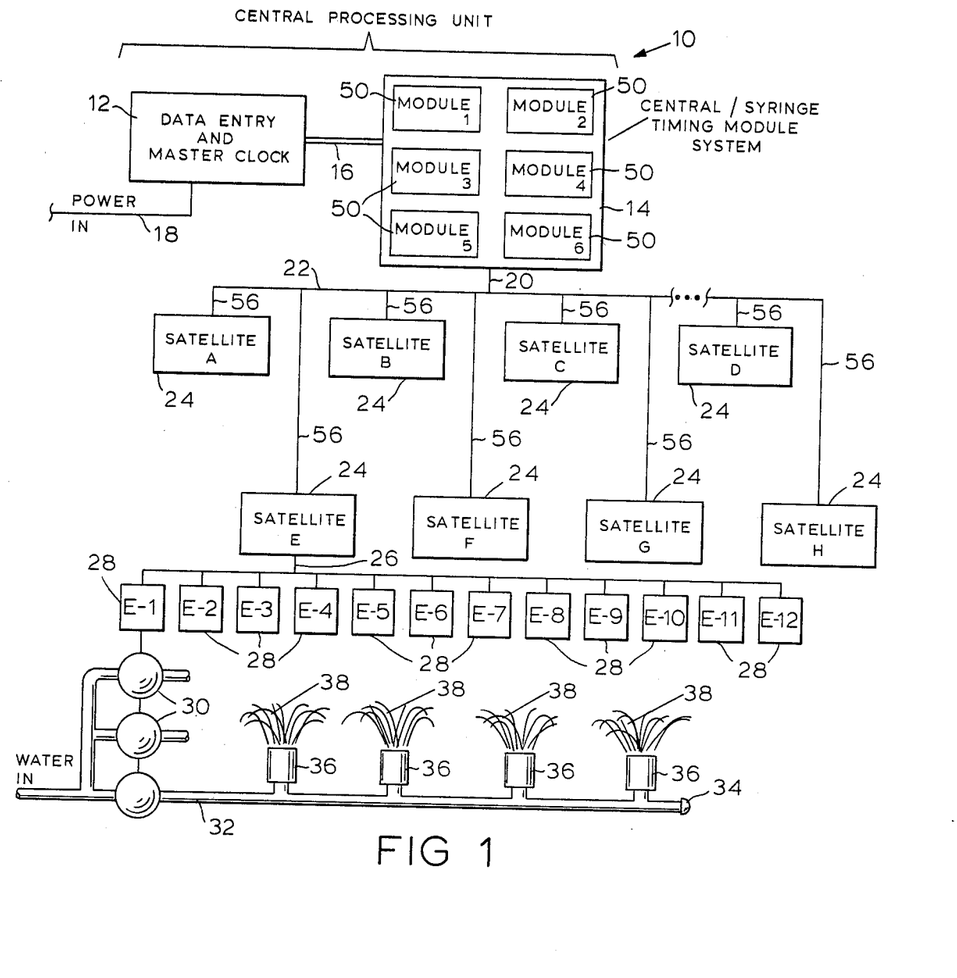
FIG. 1 is a simplified block diagram of the irrigation control system of the present invention.

Referring first to FIG. 1, the control system of the present invention is shown in simplified block diagram form. The heart of the system is a central processing unit generally indicated as 10. The central processing unit 10 is intended to be mounted in a central location such as the groundskeeper's office. The central processing unit 10 comprises a master controller 12 which provides the data entry and master clock functions and a central/syringe timing module system 14 which maintains uniquely group identified functions to be described more fully hereinafter. Controller 12 and module system 14 are interconnected by control cable 16 and power is provided by power cable 18 connected to master controller 12 on one end and to an appropriate source of power (not shown) on the opposite end.

The output of central processing unit 10 appears at output 20 of central/syringe module system 14 which, in turn, is connected to bus 22 to which a plurality of satellite controllers 24 are connected.

Each satellite controller 24 is adapted to function in the manner of the satellite controller 24 labeled "E". As can be seen, the output 26 of each satellite controller 24 can be connected to up to 12 output stations 28 such as those labeled E-1 through E-12. Each output station 28 is adapted to control up to four solenoid valves 30 such as those shown connected to the output station 28 labeled "E-1". As can be seen, the solenoid valves 30 are disposed in series with an irrigation line 32 connected to a source of pressurized water (not shown) on one end, being closed on the opposite end as by cap 34 and having a plurality of sprinkler heads 36 disposed therebetween such that upon the opening of solenoid valve 30 water 38 is emitted from the sprinkler heads 36 in an appropriate irrigation pattern and quantity.

Figure 2:
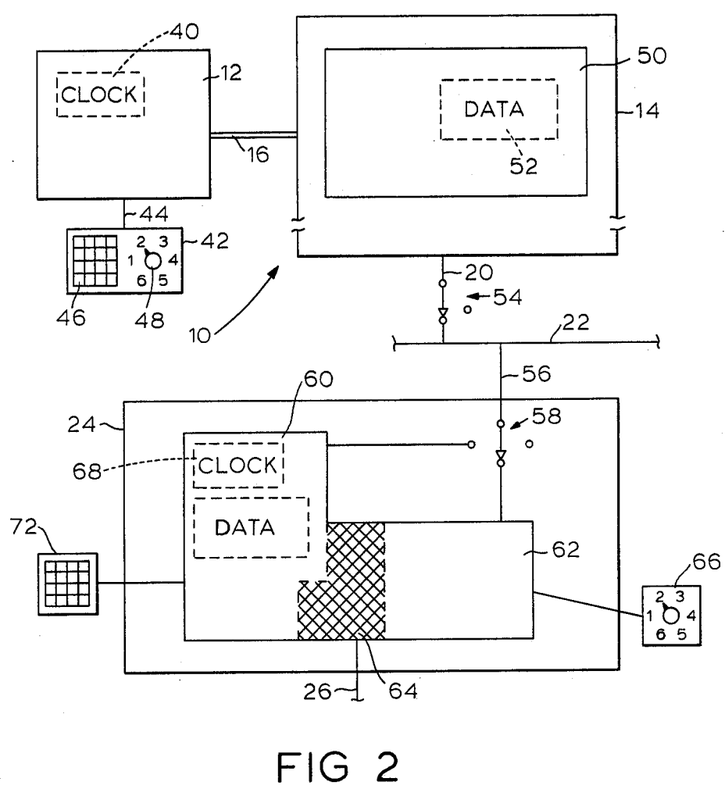
FIG. 2 is a more detailed block diagram of portions of the irrigation control system of the present invention.

Turning now to FIG. 2, portions of the system of the present invention are shown in greater detail but still in simplified block form to make the approach of the present invention more readily apparent.

In particular, the master controller 12 contains a master real-time clock logic 40. Additionally, master controller 12 has a master data input panel 42 operably connected thereto as with cable 44. The master data input panel 42 contains an input keyboard 46 and a module selector switch 48, both of which will be discussed in greater detail hereinafter. As shown in FIG. 1, the central/syringe module system 14 contains a plurality of uniquely identified modules 50. As shown in FIG. 2, each module 50 contains its own data matrix 52 containing values of start times, run times, etc. The logic of master controller 12 and central/syringe module system 14 is such that the value of the real-time clock 40 is constantly compared against the various prestored start times contained within the data matrices 52 of the individual modules 50. Each time a match is found, therefore, it can be associated with a particular module 50 for purposes to be discussed hereinafter. The prestored data within each data matrix 52 can be individually set and/or changed by use of the master data input panel 42. As shown in FIG. 1, each module 50 has a unique identifying number associated therewith as, for example, the numbers 1–6 affixed to respective ones of the modules 50 in FIG. 1. By positioning the module selector switch 48 to the number associated with the module 50 to be programmed, the values input through input keyboard 46 are taken by the logic of master controller 12 and central/syringe module system 14 and placed in the appropriate data matrix 52 of the selected module 50.

As previously stated, the output 20 of central/syringe module system 14 is connected to bus 22. To provide ultimate system control from the central processing unit 10, a master output switch 54 is placed in series with output 20. By opening master output switch 54, all outputs to the system are, thereby, disabled.

Each satellite controller 24 is connected to bus 22 by an input line 56. Input line 56 connects to the wiper arm of a mode selector switch 58. Each satellite controller 24 contains two major sub-logic systems. The first is a stand-alone controller logic 60 substantially identical with that described in the aforementioned co-pending Kendall et al application. The second is a satellite interfacing logic 62. The two logic portions 60, 62 share an output logic portion 64 (shown cross-hatched in FIG. 2) in common. The mode selector switch 58 has three positions. In one position, the individual satellite 24 is off and, therefore, produces no outputs to the output stations connected thereto. When connected to satellite interfacing logic 62, the satellite controller 24 responds to signals produced by the central processing unit 10. A module selector switch 66 is connected to the satellite interfacing logic 62 of each satellite 24. By setting the switch 66, each satellite controller 24 is made responsive to outputs associated with one of the unique modules 50. As the central processing unit 10 finds a match between the value of the master real-time clock 40 and start time data within the data matrix 52 of the module 50 having the identifier selected by the particular module selector switch 66, a signal is sent from output 20 along bus 22 through input line 56 to satellite interfacing logic 62 containing a unique identifying signal portion associated with the particular module. Satellite interfacing logic 62 is adapted to recognize signals bearing this unique identifying number and respond thereto. An appropriate output is then made through output logic portion 64 at output 26.

When mode selector switch 58 is positioned to connect to stand-alone controller logic 60, the satellite clock 68 and data matrix 70 are used to generate output signals at output 26 associated with preselected data input through a satellite keyboard 72 in the manner of the apparatus discussed in detail in the aforementioned co-pending Kendall et al application.

Figure 3:
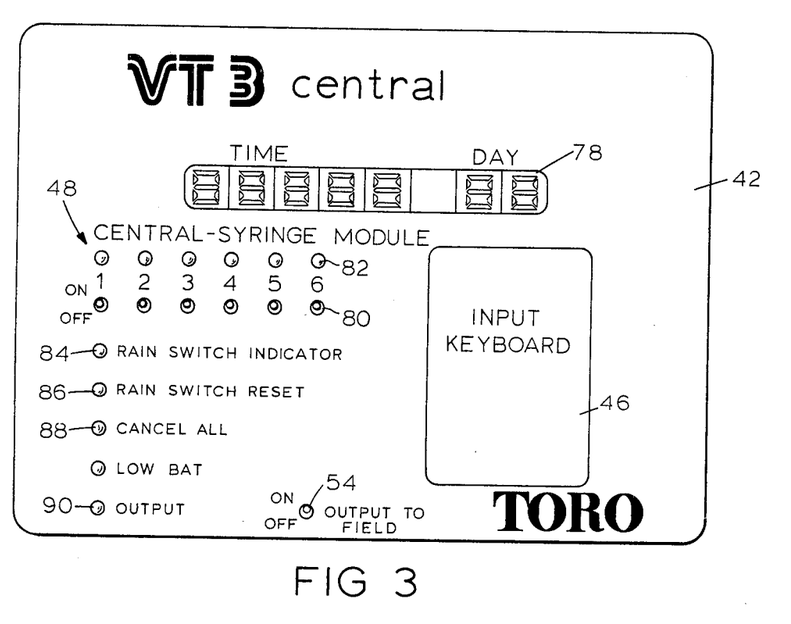
FIG. 3 is a detailed drawing of the front panel of the master controller employed in the present invention exclusive of the data entry keyboard thereof.
Figure 4:
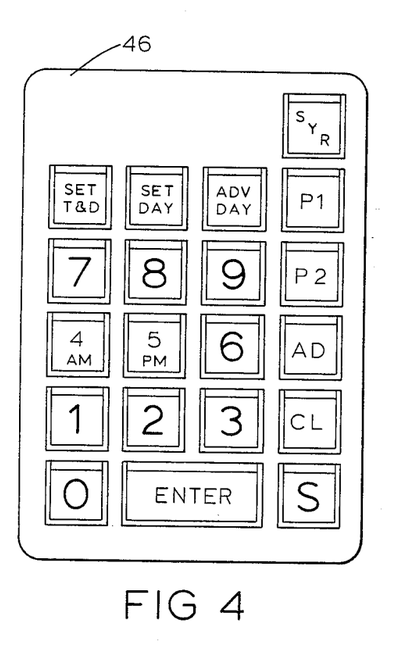
FIG. 4 is a detailed drawing of the data entry keyboard of the master controller of FIG. 3.
Figure 5:
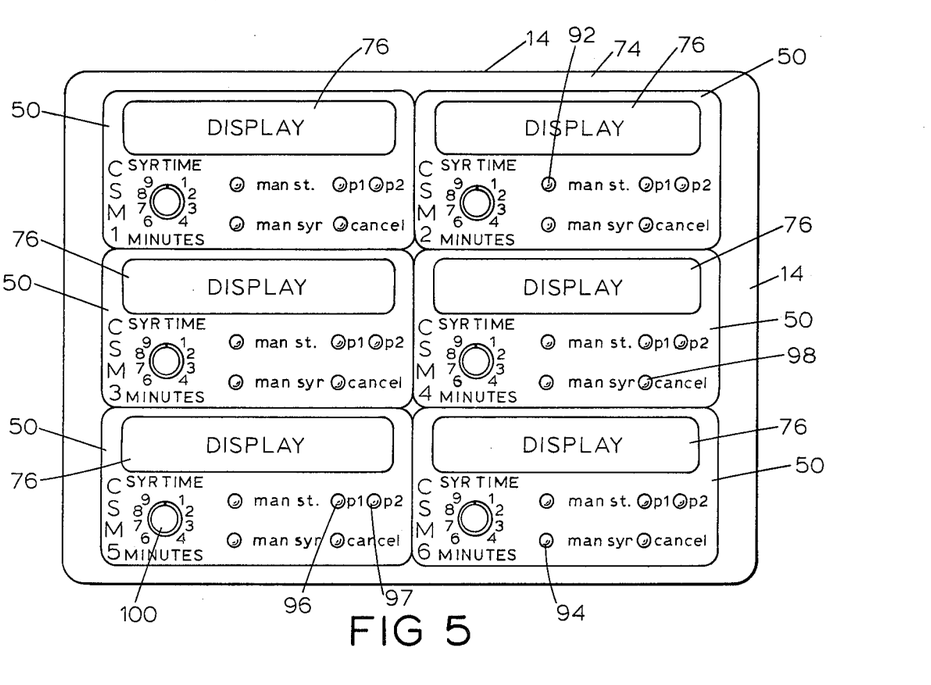
FIG. 5 is a detailed drawing of the front panel of the central/syringe timing module system employed in the present invention exclusive of the displays thereof.

Referring now to FIGS. 3–6, the central processing unit 10 will be discussed in greater detail. FIG. 3 shows the master data input panel 42 in detail with the exception of the input keyboard 46, which is shown in detail in FIG. 4. In similar manner, the control panel 74 of the central/syringe module system 14 is shown in FIG. 5 in detail with the exception of the displays 76 thereof, which are shown in detail in FIG. 6.

Referring first to FIG. 3, the master data input panel can be seen to have the following main elements:

1. A keyboard 46 for data entry.

2. A seven digit light emitting diode (LED) read-out 78 which maintains the time of day and day designation of a 14 element program. As indicated, five digits are designated to time. The first four digits represent the time of day and the fifth digit is an A or a P for the a.m. and p.m. designations. The latter two digits indicate the day of the 14-day sequence. This concept is discussed in detail in the aforementioned co-pending Kendall et al application and reference should be made thereto for a detailed explanation of this method of operation.

3. A row of LEDs and toggle switches generally indicated as 48 represent the module selector switch previously discussed. While a rotary switch as employed in the foregoing drawings for simplicity could be employed, in the preferred embodiment, individual toggle switches 80 with individual associated LEDs 82 are employed.

4. A rain switch indicator 84 (i.e. an LED) and an associated rain switch reset button 86 (which is a push button) whereby the operator can reset a rain condition in a manner to be discussed hereinafter.

5. A master cancel button 88.
6. An output monitor neon lamp 90.
7. A switch which activates the signal line to the field (being switch 54 previously discussed).

Referring now to FIG. 5, the control panel 74 of central/syringe module system 14 comprises six individual display panels of the six modules 50. Each individual module display panel is comprised of the following items:

1. An LED display 76 which indicates the start times and program designation.
2. A MANUAL START control button 92.
3. A MANUAL SYRINGE control button 94.
4. A pair of control buttons 96 for selecting program 1 or program 2 in the manual modes.
5. A CANCEL control button 98.
6. A selector switch 100 for establishing syringe times in minutes.

Turning now to FIG. 4, the keyboard 46 can be seen to comprise a 20-key panel set in a 4×6 matrix preferably employing positive tactile actuation. The key functions are as follows:

(a) The ten keys labeled numeric "0" through "9" are used for digital data entry. As will be seen, the "4" and "5" keys are also labeled "AM" and "PM" respectively and are used to establish a time as either a.m. or p.m. in a manner to be discussed hereinafter.

(b) Set time and day (SET T&D) is used to enter the real time of day and day of the week.

(c) Set active day (SET DAY) is used to establish active start times to the central/syringe module.

(d) Advance day (ADV DAY) is used to index from one day to another while programming start times to the central/syringe module 14.

(e) ENTER is a double wide key used to enter information into memory.

(f) Syringe (SYR) is used to set a syringe mode to active start times while programming.

(g) Program 1 (P1) is used to set Program 1 to active start time while programming.

(h) Program 2 (P2) is used to set Program 2 to active start time while programming.

(i) Advance (ADV) is used to advance from one active start time to another.

(j) Clear (CL) is used to clear a false entry or erase from memory.

(k) Start (S) is used to establish a program sequence into memory.

Referring once again to FIG. 3 and, more specifically, to display 78, it will be remembered that the first five digits of the display 78 are the clock. This clock displays the real-time in a.m. or p.m. AM is designated by an "A" and PM is designated by a "P". The clock changes from a.m. to p.m. at the minute change following 11:59 P and from p.m. to a.m. at the minute change following 11:59 A. The sixth digit position is a one character blank. The last two digits keep the sequence of days represented by a numeric read-out. The numeric read-out is 1 through 14. When the display reads 1 through 9, the number is preceded by a zero. The numeric day displays correspond to a 14-day two-week function. At the end of the fourteenth day, the display changes from 14 back to 01. In order to provide a realistic work day, a day is not defined as from midnight of one day to midnight of the next day. Rather, the transition period from one day to the next occurs at 6:00 a.m. That is, 559A 04 next becomes 600A 05.

As previously mentioned, the module selector switch 48 in the preferred embodiment comprises six light emitting diodes 82 and six double pole-double throw toggle switches 80. The LEDs and switches are matched in rows. Each pair (LED and switch) is in a column and numbered 1 through 6. The switch row is labeled "ON" and "OFF". This system is used to address each central/syringe module 50 while in a programming sequence. If, for example, central/syringe module #3 is to be programmed, toggle switch #3 is placed in the "ON" position. The LED #3 then illuminates indicating module #3 is now directly interfaced with the keyboard and memory system. The appropriate toggle switch 80 for each central/syringe module 50 must be activated for any programming to be accomplished. The programming characteristics are based on a priority format via the LED-toggle switch array 48. If all the switches 80 (or any grouping over one) are in the "ON" position, the lowest number has priority over all others for programming. That is, if switch #2 and 4 are "ON", only central/syringe module number 2 will be addressable until the #2 switch is placed in the "OFF" position.

The rain switch indicator 84 and RAIN SWITCH RESET button 86 previously referred to are used in combination with a third element (not shown) being a remote rain switch unit responsive to rainfall and having an internal normally opened switch. The remote rain switch unit is designed to have its normally opened switch contacts closed in the presence of a preselectable amount of rainfall. When this occurs, the central processing unit 10 enters into the rain switch mode. The rain switch indicator 84 is then illuminated and a total system cancel operation is initiated. This cancel sequence terminates all programs in existence. When the cancel sequence has been completed, the system enters a standby mode. No signals to the field can be output either manually or automatically and all automatic program sequences are ignored. While in this mode, any automatic or manual program sequence will not be stored. The RAIN SWITCH RESET push button 86 must be manually actuated to terminate the rain switch mode. Additionally, a complete power failure (line and battery) will also terminate the mode. When the RAIN SWITCH RESET button 86 is depressed, the system logic is such as to resume normal operation and cease illumination of the rain switch indicator 84. Note that the time keeping mode and display functions must remain active with the system in the rain switch mode.

The CANCEL ALL button 88 is a normally opened single pole, single throw momentary push button switch. When it is manually activated, the central processing unit 10 enters into a master cancel program sequence. This sequence establishes a paired priority cancel program to all satellites that are established in the system mode and active. The cancel signal is a signal train to the satellites and is repeated 12 times to assure that any electro-mechanical satellite clocks are returned to the "OFF" position. The cancel signal sequence is based on a paired priority sequence. If, for example, central/syringe modules 1, 2, 4, 5, and 6 are operational, the system sends the cancel signal in the following sequence until the last central/syringe module group of satellites is off: 1-2 . . . (repeated 12 times) then 4-5 . . . (repeated 12 times) then 6 . . . (repeated 12 times). The cancel sequence always establishes the first two active central/syringe modules 50, then the next two consecutive modules, etc.

The OUTPUT monitor 90 is a 117 VAC neon lamp that is connected in parallel with the signal line to the field. Whenever a signal is being output by the central processing unit 10, the neon lamp 90 monitors the line. As the signal train progresses through its sequence, the monitor lamp 90 will illuminate, blink as the signal passes, and stay on as the line stays on. It goes out as the system terminates the output signal.

Referring once again to FIG. 6, the display 76 of each module 50 is shown. The first five digits of the display 76 show the start times that are assigned to the module via the keyboard 46 and module selector switch grouping 48 of the master data input panel 42. Note that each module 50 has the capability of being programmed with eight independent automatic start times for each dey of the fourteen-day program cycle. The sixth digit position represents the automatic program that has been assigned to the start time. A "1" represents satellite program 1. A "2" represents satellite program 2. These two numbers are the only two digits that can be entered without creating an error. The seventh digit section is composed of two LED indicators 102 and 104 for indicating active day and syringe mode respectively. When the displayed start time has been assigned as active to the designated day on the master clock, the active day indicator 102 is illuminated. Consequently, when indicator 102 is not illuminated, the start time displayed has not been assigned as active to the day displayed on the master clock. When the displayed start time has been assigned as an automatic syringe start time, the syringe indicator 104 is illuminated.

Turning once again to FIG. 5, the syringe time selector switch 100 referred to briefly hereinbefore can be seen to be a ten-position single pole rotary switch. Each position is labeled with a number (0-9) which corresponds to the time lapse between output syringe signals to the field satellites. In the "0" position, no syringe time is possible and no syringe signal will be transmitted to the field satellite.

The manual start function is a one-time start signal to the field satellites. It is accomplished by use of the three normally opened single pole, single throw momentary push button switches associated with the manual start control button 92 and the P1 and P2 buttons 96, 97. Actuation of the manual start button 92 sets up the manual program and actuation of the P1 or P2 button 96 transmits the appropriate command to the field satellites. If the field satellites are in a run-time sequence, the manual program command is ignored.

The manual syringe function is a one-time syringe program to the field satellites. In a manner similar to the manual start function it is accomplished with three normally opened single pole, single throw momentary push button switches associated respectively with the manual syringe control button 94 and, once again, the P1 and P2 buttons 96, 97. Actuation of the manual syringe control button 94 sets up the syringe program and actuation of either the P1 or P2 button 96 or 97 transmits the appropriate command to the field satellites. If the field satellites are in a run-time sequence, the manual syringe program will override the program that is in operation.

The cancel control button 98 is associated with a normally opened single pole, single throw push button switch. Upon actuation, it establishes the cancel program sequence that is transmitted to the field which is a one-time program terminating all run-time programs that are in existence via the field satellites.

Figure 7:
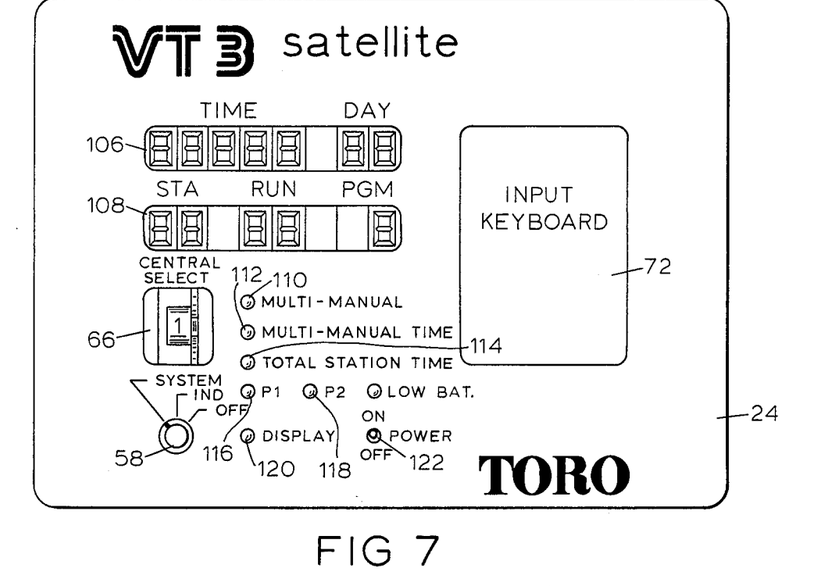
FIG. 7 is a detailed drawing of the front panel of a satellite controller employed in the present invention exclusive of the data entry keyboard thereof.
Figure 8:
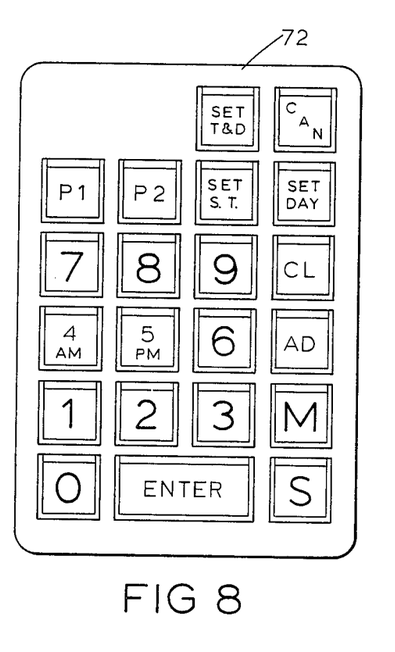
FIG. 8 is a detailed drawing of the data entry keyboard of the satellite controller of FIG. 7.

Turning now to FIGS. 7 and 8, the operation of the satellite controllers 24 will be discussed in greater detail. The data functions and independent operation of the satellites 24 are substantially identical to those described in the aforementioned co-pending application of Kendall et al. Reference should be made thereto for a detailed explanation. For example, the input keyboard 72 and two displays 106 and 108 are well-described therein.

In addition to the embodiment described in said Kendall et al application, however, the satellites 24 contain module selector switch 66. In the preferred embodiment, selector switch 66 employs a seven-position thumb-wheel switch. This is easily accomplished by employing a normal ten-position thumb-wheel switch with stops at "0" and "6". Switch 66 interfaces with the system and specifies to the central/syringe module system 14 which module 50 the satellite 24 will accept operational commands from. In the "0" position, the satellite 24 will accept no command issued from the central processing unit 10. When switch 66 is placed in any other position, 1 through 6, that number indicated represents the central/syringe module 50 the satellite 24 interfaces with and accepts operational commands from. Note that by this method of implementation, each satellite 24 can only be made responsive to one module 50 at a time but that the module 50 to which the satellite 24 is responsive can be easily and readily changed to achieve the objectives of the present invention.

The mode selector switch 58 is a three-position rotary switch. Each position is identified with a mode that the satellite 24 will operate in. In the SYSTEM position, the satellite 24 accepts commands from the central processing unit 10 for all output functions. In the independent (IND) position the satellite 24 operates as an independent twelve-station controller. All output functions are issued via the programming data in memory. Any automatic starts must be entered into memory. In this position, any command from the central processing unit 10 is ignored. In the OFF position the satellite is off. It will not accept any commands from the central processing unit 10. It will not generate any program starts via memory and the display is off. While in this position, the memory is not altered. Power is still maintained and all information entered into the memory is maintained. The clock is still in operation, but not displayed.

To provide additional functions, each satellite 24 is provided with a MULTI-MANUAL button 110, a MULTI-MANUAL time button 112, a TOTAL STATION TIME button 114, a P1 button 116, a P2 button 118, a DISPLAY button 120, and a power switch 122.

A multi-manual function is accomplished through the actuation of two normally opened momentary push button switches and data entry through the keyboard in a manner to be described in greater detail hereinafter. This function allows for the selection of up to six output stations to be run on a one-time manual basis. All six stations, after programming, will run for the same length of time at the same time.

The TOTAL STATION TIME button 114 allows for the display of the total, programmed, station run-time. Upon actuation of this switch, in conjunction with the P1 or P2 switch by pressing the P1 or P2 button 116, 118, the display shows the total time for all stations programmed for P1 or P2 as selected. The display is in hours and minutes. For example, if P1 has each of the twelve stations programmed to run for 22 minutes, the display will show 424 (e.g. 4 hours and 24 minutes).

The power switch 122 is a double pole, double throw toggle switch connected in series with the incoming power to the satellite (not shown). In the "ON" position, power is supplied to the system. In the "OFF" position, all power to the system is terminated. All programmed data will be lost when the switch is placed in the "OFF" position.

The DISPLAY button 120 actuates a normally opened single pole, single throw momentary push button switch. Upon actuation, the system logic turns on the display and maintains it in the on condition for approximately 30 seconds.

SPECIFIC LOGIC CONSIDERATIONS

Exemplary logic diagrams for the accomplishment of the majority of the functions of the satellites employed herein are set forth in detail in the aforementioned co-pending application of Kendall et al. Consequently, specific logic flowcharts for the present invention are not included herewith. The specific manner of accomplishing the present invention should be obvious to one skilled in the art with reference to the flowcharts of the aforementioned co-pending Kendall et al application in conjunction with the operational descriptions which follows hereinafter.

CENTRAL PROCESSING UNIT-LOGIC AND PROGRAMMING CHARACTERISTICS

Upon initial power-up after installation or if a complete power loss has occurred, all displays show eights (all segment of all are displays on). The following programming format should be followed for proper operation.

A. SET TIME AND DAY

1. Actuate the set time and day key (SET T&D). All the displays clear. The master clock display 78 shows all bars (center segments of each display) as prompting characters.

1.1 Enter the real time by depressing the digit keys (0–9), in numeric order, from left to right. The bars are replaced by digits as they are entered.

1.1.1 If the hour is a single digit, a zero must precede it or an error is generated.

1.1.2 Check the display to verify the correct entry.

1.1.3 The AM or PM key (numeral 4 or 5 key) is then actuated to establish that part of the day.

1.1.3.1 AM is determined by the "4" key. PM by the "5" key.

1.1.3.2 If AM or PM is not entered, the display flashes and an "E" appears in the AM/PM digit of the display indicating an error.

1.2 The day of the week is entered next. It must be entered as a two digit number or an error is created.

1.3 As the time and day are being entered, the bars (prompting characters) are replaced with digits as the keys are actuated.

1.4 When the correct time and day have been entered and verified as correct, actuate the ENTER key and then the start key(s). The master clock 40 starts keeping time.

1.5 If a change is desired while the system is in the program mode, actuation of the clear (CL) key removes the entry from the system and the display returns to the bar readout. Re-entry of the time and day is then necessary.

1.6 If the start key(s) is depressed while the system shows any prompting characters, an error is created.

1.7 If re-setting the clock time is necessary, due to power loss or time change, actuation of the set time and day key (SET T&D) places the system into the time program mode and the display reads all prompting characters.

1.8 While the system is in this program mode, no other display is on, the system is in a standby mode, no pre-established program will activate, and the clock is stopped.

B. PROGRAMMING AUTOMATIC START TIMES

Automatic start times are established in each of the active central/syringe modules 50. The start times for each module are established to each day of the fourteen day program. Each day can accept thirty start times allocated between the various modules 50 as desired. For example, if all six modules 50 are active, each could have five start times or three could have eight and three could have two, etc.

With the system being capable of accepting thirty start times, anytime of day may be entered in any sequence. The entered data is stored in memory in the data matrix 52 as programmed. The system sorts these start times and automatically initiates start commands in the correct sequence.

1. Select the first central/syringe module 50 to be programmed and establish its program active status by placing the appropriate toggle switch 80 in the "ON" position. The indicator 82 will illuminate and the keyboard address system 46 will become active.

Figure 6:
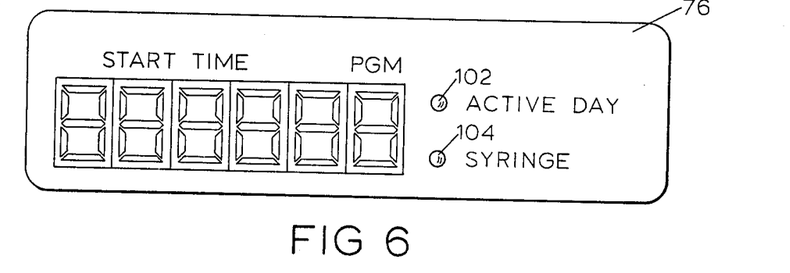
FIG. 6 is a detailed drawing of the display employed in the central/syringe time modules of FIG. 5.

2. Depress the SET DAY key. The master clock clears and the day section shows "00". The central/syringe module display 76 shows all prompting characters.

2.1 Depress the advance day (ADV DAY) key. The day portion of display 76 shows "01".

2.3 Enter the desired automatic start time.

2.3.1 Enter a four digit number for the time. The prompting characters are replaced by the numbers entered.

2.3.1.1 If the hour is a single digit, it must be preceded by a zero.

2.3.2 Assign an A.M. or P.M. to the time displayed.

2.3.3 Assign a program one or program two to the start time.

2.3.3.1 Depress the P1 button 96 for program one or the P2 button 97 for program two.

2.3.4 If the start time being entered is to be an automatic syringe start, actuate the syringe key (SYR). The indicator labeled SYRINGE 104 is illuminated.

2.3.5 Verify that the displayed time is accurate.

2.3.6 Depress the ENTER key. This establishes that time into memory.

2.3.7 If more than one automatic start time is desired; total of thirty.

2.3.7.1 Actuate the advance key (AD). The display clears and again shows all prompting characters.

2.3.7.2 Repeat steps 2.3.1 through 2.3.6 each additional start time.

2.3.7.3 When all start times have been entered, the next actuation of the advance key (AD) displays the first entered start time.

2.4 Depress the advance day key (ADV DAY). The day display changes to "02". The central/syringe module display 76 shows all prompting characters.

2.4.1 If day 02 is to be an active watering day, enter automatic start times as outlined in paragraph 2.3.

2.4.2 If day 02 is to be an inactive watering day, bypass it by actuating the advance day key (ADV DAY). The day display shows day 03.

2.4.2.1 Either assign start times to day 03 or bypass it.

2.5 When all days that are to be active watering days have been programmed, place the toggle switch 80 in the "OFF" position.

2.5.1 The master clock display returns to the time keeping mode.

2.5.2 The central/syringe module 50 that has been programmed displays the next start time.

2.5.2.1 If the displayed start time is active for the day shown on the master clock, the active day indicator 102 is on.

3. Select the next central/syringe module 50 to be programmed and place the appropriate toggle switch 80 in the "ON" position.

3.1 Repeat the procedure as outlined in sub-section 2.

4. Repeat this procedure for each of the central/syringe modules 50 that are to be active.

C. ESTABLISHING SYRINGE TIME

1. Each central/syringe module 50 has a 10 position rotary switch 100 identified as "SYR TIME MINUTES" with numbers around the circumference noted "0 thru 9". These numbers represent the time in minutes between syringe output signals to the field when an automatic start time is programmed as syringe or a manual syringe start has to be selected.

2. In the "0" position, no syringe signals are generated.

3. The time in minutes selected must be of a shorter duration than the smallest, preset station run time of the satellites 24.

SATELLITE CONTROLLERS-LOGIC AND PROGRAMMING CHARACTERISTICS

Upon initial power-up after installation or if a complete power loss has occurred, all displays show eights (all segments of all displays on). The following programming format should be followed for proper operation.

A. SET TIME AND DAY

1. Actuate the set time and day key (SET T&D). The display 108 clears. The clock display 106 shows all bars (center segments of each display) as prompting characters.

1.1 Enter the real time by depressing the digit keys, in numeric order, from left to right.

1.1.1 If the hour is a single digit, a zero must precede it or an error is generated.

1.1.2 Check the display to verify the correct entry.

1.1.3 The AM or PM key (numeral 4 or 5 key) is then actuated to establish that part of the day.

1.1.3.1 AM is determined by the "4" key. PM by the "5" key.

1.1.3.2 If AM or PM is not entered, the display flashes and an "E" appears in the AM/PM digit of the display indicating an error.

1.2 The day of the week is entered next. It must be entered as a two digit number or an error is created.

1.3 As the time and day are being entered, the bars (prompting characters) are replaced with digits as the keys are actuated.

1.4 When the correct time and day have been entered and verified as correct, actuate the ENTER key and then the start key(s). The satellite clock 68 starts keeping time.

1.5 If a change is desired while the system is in the program mode, actuation of the clear (CL) key removes the entry from the system and the display returns to the bar read-out. Re-entry of the time and day is then necessary.

1.6 If the start key(s) is depressed while the system shows any prompting characters, an error is created.

1.7 If re-setting the clock time is necessary, due to power loss or time change, actuation of the set time and day key (SET T&D) places the system into the time program mode once again and the display again reads all prompting characters.

1.8 While the system is in this program mode, no other display is on, the system is in a standby mode, no pre-established program will activate, and the clock is stopped.

B. SET START TIME

1. The system has the capability of establishing six independent start times in a 24 hour day. If the station running sequence overlaps into the next programmed start time, that next start time is maintained. All days established as active watering days have the same starting time.

1.1 Actuation of the set start time key (SET S.T.) places the system into a programming mode. The time clock portion of display 106 changes to all prompting characters (bars). The day section of display 106 is blank.

1.2 Enter the desired start time in the same order as used in entering the clock time. A four digit time followed by "A" or "P".

1.3 If an error is made while entering data, the display flashes and actuation of the clear key (CL) is required.

1.4 When the start time has been entered, actuation of the ENTER key sets that time into memory.

1.5 If more than one start time is desired, after the first is entered into memory, actuate the advance key (AD). This indexes to the next available start time.

1.5.1 Enter the next start time, actuate the ENTER key. This process may be repeated for the six start times.

1.6 If a start time is to be changed while in the programming mode, a new start time may be entered in place of the time to be changed (writing over the old start time).

1.6.1 Actuation of the clear key (CL) also removes the old start time. Re-entry of data may then be made.

1.6.2 If the system is out of the program mode, actuation of the set start time key (SET S.T.) is required. Use the advance key (AD) to index to the time that is to be changed and enter the new data.

1.7 With the system capable of accepting six start times, any time of day may be entered in any sequence from one to six starts.

1.7.1 The entered data is stored in memory as programmed. The system sorts these times and automatically initiate starts in the correct sequence.

1.7.2 Unused start times remain as prompting characters and when stepping through the memory to recall data, all six start times are displayed. Those left at bars will be displayed as bars.

1.8 When programming or recalling start times is complete, actuation of the start key(s) establishes memory and the system returns to clock time.

1.9 While programming start times, if seven starts are entered, the seventh start is retained by the system and the first entered start time is dropped.

1.9.1 If eight start times are entered, the first two start times are dropped, etc.

C. SET STATION RUNNING TIME

Establishing station run times for program one and program two is essentially the same procedure. For establishing program one station run times, actuate "P1". For establishing program two station run times, actuate "P2". The sequence outlined below is for both program one and program two.

1. Establishing station running times is accomplished by assigning a time in minutes to each of the 12 stations used. Any running time from 1 to 60 minutes may be established. Times over 60 minutes create a false entry and the display flashes as an indication of an error.

1.1 Actuation of the "P1" key establishes Program One programming mode. The station portion of display 108 reads zeroes, the run time portion reads zeros and the program portion reads "1".

1.2 Actuation of the advance key (AD) indexes the system to station one. The station display reads "01".

1.2.1 Enter a running time in minutes via the numerics keys (0-9). If the running time is from 1 to 9 minutes, that entry must be preceeded by a zero.

1.2.2 Actuation of the ENTER key sets that time into memory. Depress the advance key (AD) to index to the next station number and repeat the data entry process.

1.3 If an error is made (flashing display) or a change is desired, depress the clear key (CL) to remove the information. The run time display shows all zeros at that time.

1.4 If a change is required while stepping through the program to recall information or after a time has been entered into memory, either actuate the "clear" key (CL) or write over the old time. Actuate the ENTER key to set the new time in memory.

1.4.1 This action will erase the previous run time.

1.5 When all station running times are programmed, actuation of the start key (S) sets memory and returns the system to clock time.

1.6 If less than 12 stations are used or a blank station is desired when programming data, those stations should be left at zero run time.

1.6.1 This is accomplished by stepping-by those stations while programming.

D. SET ACTIVE WATERING DAYS

1. Each day of the 14 day cycle is programmed to be either active (water) or inactive (off). Each day is programmed to water stations for program one, program two, or be "off" for that day.

1.1 Actuation of the SET DAY key establishes the program mode. The day portion of display 106 reads zero and the program portion of display 108 reads zero.

1.2 Actuate the advance key (AD) to index to day 01. Establish that day as program one by depressing the numeric "1" key; as program two by depressing the numeric "2" key; or inactive by indexing to the next day via the advance key (AD).

1.2.1 If that day is active ("1" or "2") depress the ENTER key to set the program into memory. Actuate the advance key (AD) to index to the next station.

1.2.2 If that day is to be inactive, "0", index to the next station by depressing the advance key (AD).

1.3 Use the advance key (AD) to index to each of the 14 days and establish each day as active ("1" or "2") or inactive ("0"), following the procedure outlined.

1.4 An error or a false entry causes the display to flash, actuate the clear key (CL) to delete the error.

1.5 If a day is to change, index to that day and change the data either by writing over or "clearing" the information and re-entry.

E. MANUAL PROGRAMMING

The system of the present invention in its preferred embodiment is set up to allow three types of manual operation. The three are outlined with programming characteristics noted.

1. COMPLETE STATION SEQUENCE 1.1 If a complete station sequence operation is desired, actuation of the manual key (M) sets the system into the manual mode.

1.2 Depress either the "P1" key (program one) or the "P2" key (program two). This establishes the program sequence that will run.

1.3 Actuating the start key (S) initiates the one-time manual program. Each pre-programmed station runs its preset time, in sequence.

1.4 When the last station has completed its timing function, the system reverts to automatic operation.

2. SINGLE STATION OPERATION 2.1 If an individual station is to be run manually, depressing the manual key (M) sets the system into a manual mode.

2.1.1 Use the advance key (AD) to step through each station until the station that is to run manually is reached.

2.1.2 The pre-programmed running time of that station is displayed. Depressing the start key (S) activates the station for the displayed time.

2.1.3 If a run time other than the pre-programmed time is desired, a new time is entered via the numeric keys, after stepping to the desired station. The new run time is displayed in the run portion of display 108. By depressing the start key (S), the station comes on and runs for the new time.

2.2 Entering manual station run times has no effect upon the pre-programmed run time established in memory.

2.3 When the manual program is complete, the system reverts to the automatic mode.

3. MULTIPLE STATION, MANUAL OPERATION 3.1 The multiple manual is a one time manual program that has the ability to operate up to six output stations concurrently. The system can only achieve this, if one valve load is applied per station. Programming is as follows:

3.1.1 Depress the push button switch 110 labeled "MULTI-MANUAL" to establish the program mode. The clock display 106 is off. The station portion of display 108 shows "00" and the program portion shows "0".

3.1.2 Actuate the advance key (AD) to the first desired station. Actuate the ENTER key to make that station active for the program. The program display changes to a "1".

3.1.3 Actuate the advance key (AD) to the next desired station and actuate the ENTER key. The program display changes to "2".

3.1.4 Repeat this procedure for up to six stations. With each actuation of the ENTER key, the program display increases by one, thus keeping track of the total number of stations activated.

3.1.4.1 If more than six stations are attempted, they are ignored.

3.2 When all desired stations have been programmed as activated, actuate the "MULTI-MANUAL TIME" push button 112. The station portion of display 108 shows the first activated station, the run time portion shows "00", and the program portion shows a "1", indicating the first active station.

3.2.1 Enter a run time, from 1 to 60 minutes, via the keyboard. The time is displayed in the run time portion of display 108.

3.2.2 Actuation of the start key (S) initiates the one time Multi-Manual Program. All stations programmed as active come on. The station display remains on station 1. The run time display clocks the time down. The program display remains on "1".

3.2.3 When the start is actuated and the Multi-Manual Program initiated, the clock display resumes its normal function.

F. TOTAL STATION TIME 1.1 This feature allows for the totalizing of all run times programmed into memory for either program one or program two.

1.1.1 Actuation of the "TOTAL STATION TIME" push button 114 clears all displays.

1.1.2 Actuation of either "P1" or "P2" push button totals all run times that are programmed and that total is displayed in the "TIME" section of display 106.

1.1.2.1 The totalized time is displayed in hours and minutes.

1.1.2.2 After actuation of the "P1" or "P2" key, the displays remain off for approximately 15 seconds while the time is being totalized. Then it is displayed.

1.1.3 Actuation of the start key (S) returns to system to normal operation.

Thus, it can be seen from the foregoing description that the present invention truly provides a large scale irrigation control system combining a high degree of flexibility with ease of modification.

Wherefore, having thus described my invention, I claim:

1. An irrigation control system comprising:
(a) master controller means for maintaining a master real-time clock, for continuously comparing the value of said master real-time clock to entries in uniquely identified groups of pre-stored master start-time values to find matches therebetween, and for outputting at an output thereof a master control signal including an identifier of the unique group wherein the matching one of said values was found when a match is found; and,
(b) satellite controller means connected to selectively receive said output from said master controller means for maintaining a satellite real-time clock, for continuously comparing the value of said satellite real-time clock to entries in a group of satellite pre-stored start-time values to find matches therebetween, for selectively recognizing ones of said output signals from said master controller means having an identifier associated with a particular one of said groups of satellite pre-stored values, and for selectively outputting a satellite control signal for operating an irrigation solenoid valve in response to a match being found between said satellite real-time clock value and an entry in said satellite group of pre-stored values or upon receipt of a said output master control signal from said master controller means associated with said particular group of values, said satellite controller means including means for selectively causing said satellite controller means to output said satellite control signal in response to said matches of said satellite real-time clock values, receipt of said unique group identified master control signals, or neither, and further including an output whereat said output satellite control signal appears, said latter named output being adapted for operable connection to an irrigation solenoid valve.

2. The irrigation control system of claim 1 and additionally comprising:
said satellite controller means including means for changeably designating the one of said unique group identifiers recognized by said satellite controller means.

3. The irrigation control system of claim 1 and additionally comprising:
said master controller means including keyboard means for changeably storing said entries of said master pre-stored values compared to said master real-time clock and further including means for changeably designating the one of said groups the values input through said keyboard means are made entries to.

4. The irrigation control system of claim 1 wherein:
(a) each of said pre-stored satellite start-times has a run-time associated therewith;
(b) said satellite controller means maintains each of said output satellite output control signals caused by a match between said satellite real-time clock and one of said satellite pre-stored start-time values for the associated said run-time thereof; and wherein said satellite controller means further includes,
(c) means for calculating and displaying the sum of all said run-times presently associated with said group of satellite start-times.

* * * * *